United States Patent [19]

Scott et al.

[11] 4,134,027
[45] Jan. 9, 1979

[54] CONTROL SYSTEM CAPABLE OF ACCOMMODATING A PLURALITY OF MOMENTARY SWITCHING DEVICES

[75] Inventors: Charles E. Scott, Noblesville; James E. Small, Indianapolis, both of Ind.

[73] Assignee: P.R. Mallory & Co., Inc., Indianapolis, Ind.

[21] Appl. No.: 817,126

[22] Filed: Jul. 20, 1977

[51] Int. Cl.² .......................................... H01H 43/00
[52] U.S. Cl. ................................ 307/141; 340/309.1; 328/129
[58] Field of Search .................. 307/141, 141.4, 141.8, 307/293; 361/195; 328/129; 340/309.1, 309.4

[56] References Cited

U.S. PATENT DOCUMENTS

| | | | |
|---|---|---|---|
| 3,767,937 | 10/1973 | Schmidgall | 307/141 |
| 3,774,056 | 11/1973 | Sample et al. | 307/141 |
| 3,922,889 | 12/1975 | Karklys | 307/141 |
| 3,973,135 | 8/1976 | Scott | 307/141 |
| 3,989,374 | 11/1976 | Latka et al. | 307/293 |
| 4,001,599 | 1/1977 | Karklys | 307/141 |

*Primary Examiner*—Robert K. Schaefer
*Assistant Examiner*—Morris Ginsburg
*Attorney, Agent, or Firm*—Hoffmann, Meyer & Coles

[57] ABSTRACT

A control system for a machine and the like having at least one cycle made up of at least two events utilizes at least one momentarily operable switching device to actuate the cycle and digital circuitry including a plurality of NAND and AND gates to implement a momentary zero potential signal produced by the switching device. The control system includes a control circuit having programming means, digital circuitry further including at least two NOR gates for latching the control circuit in various modes of operation, and timing circuitry for deriving a selectable timing period for at least one event of the cycle; and gate circuit means including additional digital circuitry for regulating at least another event of the cycle in response to the control circuit.

46 Claims, 11 Drawing Figures

CONTROL SYSTEM CAPABLE OF ACCOMMODATING A PLURALITY OF MOMENTARY SWITCHING DEVICES

BACKGROUND OF THE INVENTION

1. Field of the Invention

This invention relates to control systems for machines and the like of the type having at least one cycle made up of at least two events where one of the events may include at least two subevents and is more particularly concerned with control systems capable of accommodating a plurality of momentarily operable switching devices wherein at least one of the switching devices actuates the machine cycle.

Generally speaking, the control system of the present invention includes a control circuit having programming means, digital circuitry for implementing the programming means and latching the control circuit in various modes of operation, and timing circuitry responsive to the digital circuitry for deriving a selectable timing period for at least one of the events of the cycle; delay timing means for sequentially activating and deactivating the subevents; and gate circuit means for regulating at least another of the events in response to the control circuit.

2. Description of the Prior Art

The present invention represents an improvement upon our copending patent application Ser. No. 807,009 entitled "Control System Utilizing Momentary Switching Devices." U.S. Pat. Nos. 3,767,937 and 3,973,135 assigned to P. R. Mallory & Co. Inc. disclose control systems which include control circuits having timing means and other circuitry for controlling machines and the like having at least one cycle made up of at least one event. Our copending patent application, Ser. No. 807,009 improved upon U.S. Pat. Nos. 3,767,937 and 3,973,135 by introducing the use of momentary switching devices and associated circuitry to latch the control circuit in an operation mode. The present invention is a further improvement upon a control system which includes the capability of accommodating a plurality of momentary switching devices.

Previous control systems have utilized pushbutton switching devices which latch in the on position when pushed or pulled and are then released or latched in the off position in response to a solenoid release. These types of mechanical switching devices are now undesirable in many applications of control systems because of cost, reliability, and esthetics. Accordingly, latching mechanical switching devices are being replaced by momentary switching devices such as keyboard type switches or electronic touch switches as will be recognized by reference to recently issued U.S. Pat. No. 4,001,599. Since momentary switching devices do not latch, other means must be employed to latch the control circuit in various modes of operation; however, many of these latching means also limit the number of momentary switches which may be accommodated by the control circuit.

Generally, the timing means associated with control systems such as those disclosed in U.S. Pat. Nos. 3,767,937 and 3,973,135 have utilized an oscillator circuit in conjunction with a resistance capacitance timing network in order to provide a timing period for at least one event of a cycle of the machine being controlled. Where mechanical switching devices have been used, such timing means have necessitated a means for latching the timing means into a desired timing period. Accordingly, mechanical switching devices having double contacts were usually employed i.e. one contact to latch the control circuit in an operational mode and one contact to select and latch the appropriate resistance capacitance combination for a desired timing period. With the utilization of momentary switching devices to actuate a cycle of the machine, timing means required improvement so that they would not depend upon the latching of a mechanical switching device for the selection of a timing period.

Improvements to timing means have included the use of an oscillator circuit which produces a series of electrical pulses which are in turn counted to derive a timing period for a particular cycle or event of a machine such as those disclosed in U.S. Pat. No. 3,774,056 and 4,001,599; however, in most of the improvements, a timing period is predicated solely upon the number of electrical pulses counted and not upon the frequency of such pulses. Furthermore, many of such improved timing means are limited to specific timing periods once they are assembled.

Generally speaking, therefore, the present invention represents an improvement upon the control systems as disclosed in U.S. Pat. Nos. 3,767,937 and 3,973,135 and a further improvement upon our copending patent application Ser. No. 807,009 wherein the present control system is capable of accommodating a plurality of momentary switching devices and provides a plurality of selectable timing periods which can be easily altered after assembly of the control system.

SUMMARY OF THE INVENTION

In accordance with the present invention in its broadest concept, there is provided a control system utilizing momentarily operable switching devices to actuate a control circuit which latches in at least one mode of operation thereby controlling the activation and deactivation of at least two machine events.

It is an object of the present invention to provide a control circuit having programming means which utilizes momentarily operable switching devices and digital circuitry to implement the programming means and to latch the control circuit in at least one mode of operation wherein the control circuit is capable of accomodating a plurality of momentarily operable switching devices.

Another object of the present invention is to provide a control circuit wherein the programming means applies a zero potential momentary signal to the control circuit thereby actuating a machine cycle.

It is a further object of the present invention to provide a control circuit as provided hereinabove further including timing circuitry responsive to the digital circuitry for timing at least one machine event wherein the timing means includes a plurality of selectable and alterable timing periods for the event.

Yet another object of the present invention is to provide a control system for a machine and the like having at least one cycle made up of at least two events including in combination a power supply source responsive to an alternating reference signal, the control circuit as provided hereinabove of which only portions are responsive to the power supply source and alarm circuit means for regulating at least another event of the machine.

Still yet another object of the present invention is to provide a control system for a machine and the like having at least one cycle made up of at least one event which includes at least two subevents including in combination a power supply source responsive to an alternating reference signal, the control circuit as provided hereinabove of which only portions are responsive to the power supply source and delay timing means responsive to the digital circuitry of the control circuit for administering a sequential activation and deactivation of the subevents.

Other objects and advantages of the present invention will be apparent from the following detailed description of a preferred embodiment thereof, which description should be considered in conjunction with the accompanying drawings in which:

DESCRIPTION OF THE PREFERRED EMBODIMENT

Figure 1:
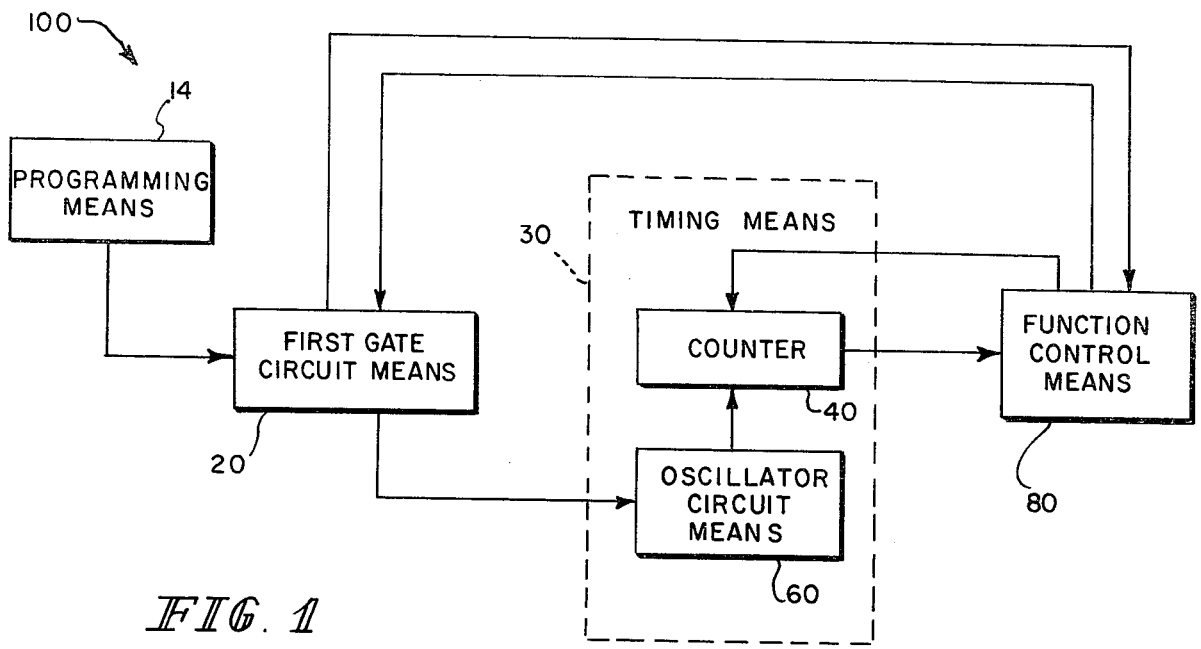
FIG. 1 is a schematic block diagram of a control circuit constructed in accordance with the present invention.

A control circuit 100 in accordance with the present invention for controlling at least one cycle of a machine and the like wherein the cycle includes at least one event is illustrated in FIG. 1 as a block diagram. The control circuit 100 includes programming means 14, first gate circuit means 20 responsive to programming means 14, timing means 30 responsive to first gate circuit means 20 wherein timing means 30 includes oscillator circuit means 60 and a counter 40 responsive to oscillator circuit means 60, and function control means 80 responsive to timing means 30 and first gate circuit means 20. Furthermore, as illustrated in FIG. 1, timing means 30 and first gate circuit means 20 are both responsive to function control means 80.

Figure 2:
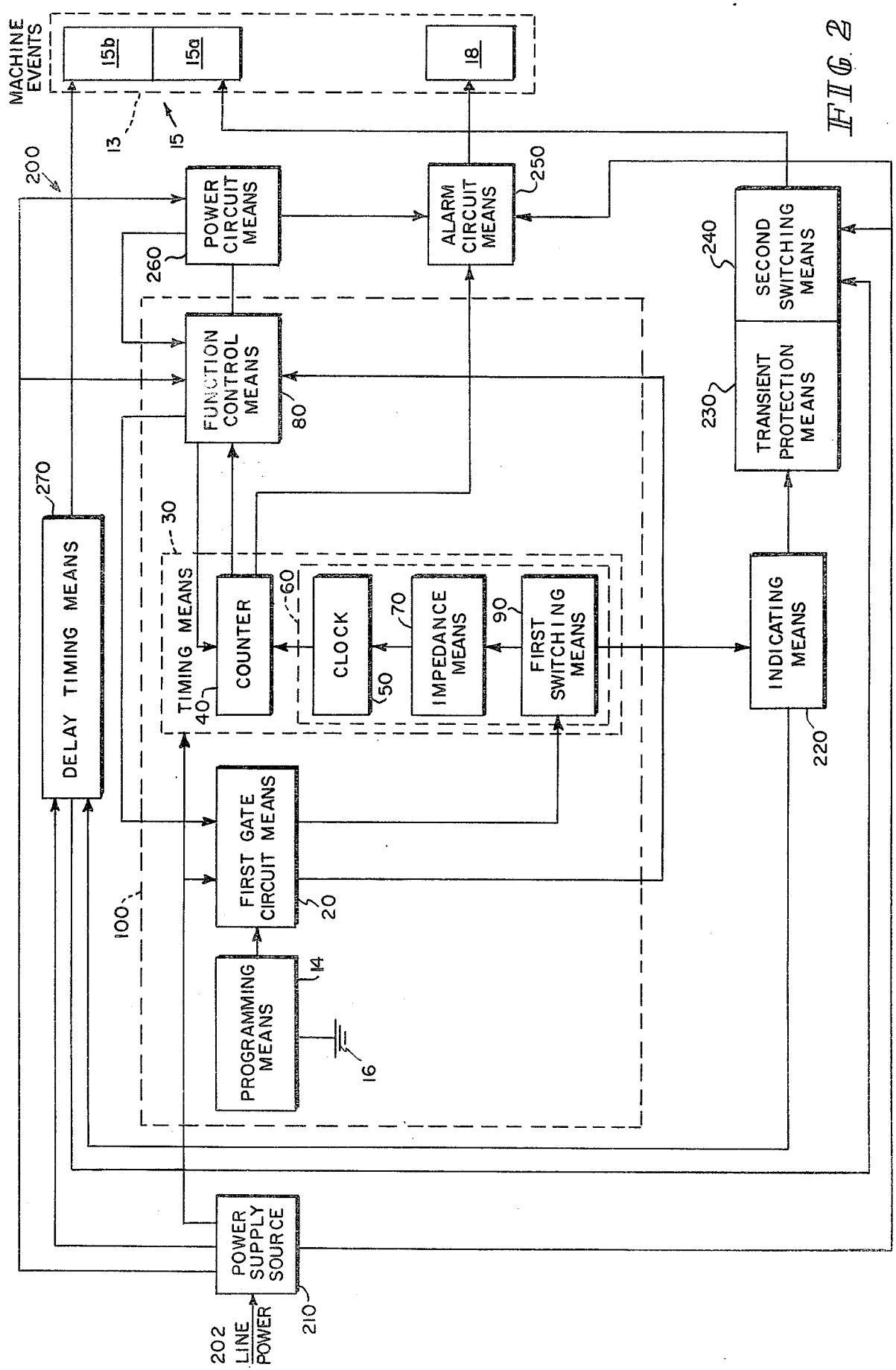
FIG. 2 is a schematic block diagram of a control system of the present invention which embodies the control circuit of FIG. 1.

Referring now to FIG. 2 a control system 200 in accordance with the present invention for controlling at least one cycle of a machine and the like wherein the cycle includes at least two events 15 and 18 and at least two subevents 15a and 15b includes a power supply source 210 responsive to an alternating reference signal 202; a control circuit 100 as described hereinabove for controlling a first event 15 wherein timing means 30 of the control circuit 100 comprises oscillator circuit means 60 responsive to an electrical signal for deriving a timing period for first event 15, oscillator circuit means 60 including first switching means 90 electrically coupled to first gate circuit means 20 for activating timing means 30, a clock 50 responsive to first switching means 90 for generating a series of electrical pulses, and impedance means 70 electrically coupled to clock 50 and first switching means 90 for defining a plurality of selectable frequencies of the electrical pulses, and control circuit 100 further comprises a counter 40 responsive to oscillator circuit means 60 for signalling the end of first event 15 in response to a predetermined number of the electrical pulses whereby function control means 80 causes the termination of first event 15 and allows for the initiation of a second event 18; indicating means 220 responsive to timing means 30 for indicating the activation and deactivation of first event 15; transient protection means 230 responsive to timing means 30; second switching means 240 responsive to transient protection means 230 for activating and deactivating a first subevent 15a; delay timing means 270 responsive to first switching means 90 for activating and deactivating a second subevent 15b in a sequential order with first subevent 15a; power circuit means 260 electrically coupled to function control means 80; and alarm circuit means 250 for activating and deactivating second event 18 in response to timing means 30 or power circuit means 260. For purposes of illustrating the association of power supply source 210 to the total control system 200 the positive side of power supply source 210 is shown in FIG. 2 as it is directly coupled to various portions of the control system 200.

Figure 3:
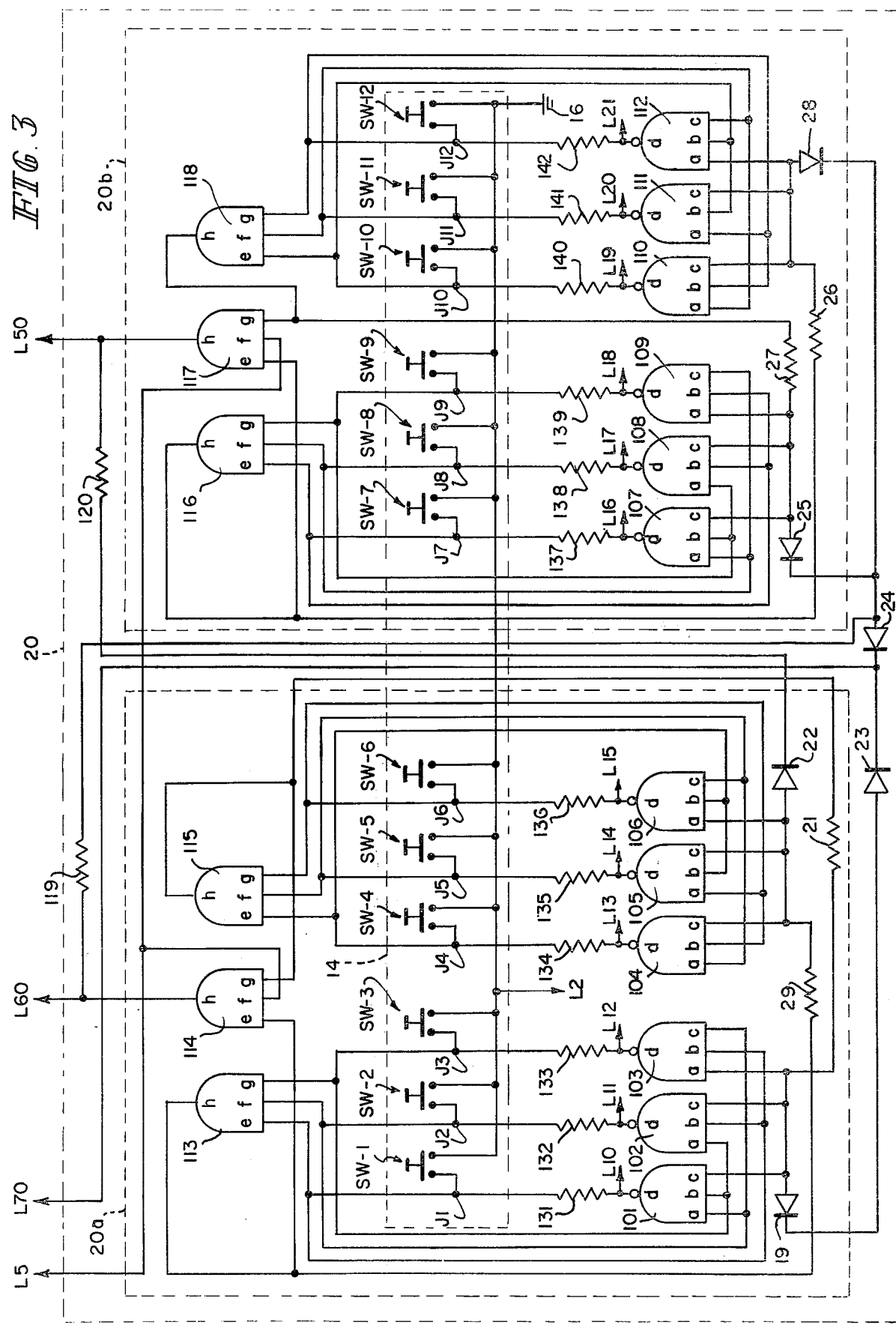
FIG. 3 is a schematic logic diagram of a means for implementing a momentarily operable switching device which may be employed in the control circuit of FIG. 1.

Illustrated in FIG. 3 are preferred embodiments of programming means 14 and first gate circuit means 20 of the control circuit 100 shown in FIG. 1.

An embodiment of programming means 14 includes twelve (12) momentarily operable switching devices SW-1 through SW-12, all of which are electrically coupled in parallel to ground potential 16 by an electrical conduit L2. The switching devices SW-1 through SW-12 may be any momentarily operable switching devices. For example, such switching devices may be momentary keyboard type switches or electronic touch control switches which when pushed do not latch but provide a momentary electrical signal.

An embodiment of first gate circuit means 20 includes twelve (12) NAND gates 101 through 112 each having three (3) inputs a, b, and c and an output d; six (6) AND gates 113 through 118 each having three (3) inputs e, f, and g and an output h, diodes 19, 22, 23, 24, 25, and 28; resistance means 21, 26, 27, 29, 119, and 120 electrically coupled to the diodes; and resistance means 131 through 142 electrically coupled to each output d of NAND gates 101 through 112 respectively. Each of the momentary switching devices SW-1 through SW-12 is electrically coupled to one input a, b, or c of two (2) of the twelve (12) NAND gates 101 through 112 at junctions J1 through J2 respectively as illustrated in FIG. 3 such that when any one of the switching devices SW-1 through SW-12 is momentarily closed a ground potential 16 representing a logical zero (0) is applied to one input, a, b, or c of the two (2) NAND gates. An input a or c of each NAND gate 101 through 112 is electrically coupled through diodes 23, 22, and 19 or diodes 24, 28, and 25 to function control means 80 by means of an electrical conduit L70 such that a logical zero (0) state of function control means 80 is applied to inputs a or c of each NAND gate 101 through 112. Furthermore, at least one input a, b, or c of each of three (3) of the twelve (12) NAND gates 101 through 112 is electrically coupled through a resistance means 131 through 142 respectively to the outputs d of each of the two (2) NAND gates which as described above are electrically coupled to a switching device SW-1 through SW-12 such that logical one (1) states of the outputs d of the two (2) NAND gates are applied to at least one input a, b, or c of the three (3) NAND gates. Each of the outputs d of NAND gates 101 through 112 is electrically coupled to oscillator circuit means 60 (FIG. 1) by means of electrical conduits L10 through L21 respectively such that a logical zero (0) appearing at the output d of one of the NAND gates 101 through 112 in response to the momentary closing of one of the switching devices SW-1 through SW-12 respectively will be transmitted to oscillator circuit means 60 thereby initiating a timing period for a machine event 13.

As illustrated in FIG. 3 each of the momentary switching devices SW-1 through SW-12 is also electrically coupled to an input e, f, or g of AND gates 113, 115, 116, and 118. In addition, each of the inputs e, f, and g of AND gates 113, 115, 116, and 118 is electrically coupled through one of the resistance means 131 through 142 to an output d of each of the NAND gates 101 through 112. The inputs f of AND gates 114 and 117 are electrically coupled to the positive side of power supply source 210 by means of an electrical conduit L5. The inputs e and g of AND gate 114 are electrically coupled to the outputs h of AND gates 113 and 115 respectively such that a change in the logical state of at least one of the AND gates 113 or 115 causes a change in the logical state of AND gate 114. The output h of AND gate 114 is electrically coupled to function control means 80 by means of an electrical conduit L60 and is electrically coupled through resistance means 119 to diodes 24 and 28. The output h of AND gate 117 is electrically coupled to function control means 80 by means of an electrical conduit L50 and is electrically coupled through resistance means 120 to diode 22. The output h of AND gate 113 is also electrically coupled through resistance means 29 to the inputs c, c, and a of NAND gates 104, 105, 106 respectively. The output h of AND gate 115 is also electrically coupled through resistance means 21 to the inputs c, c, and a of NAND gates 101, 102, and 103 respectively. Correspondingly, output h of AND gate 116 is also electrically coupled through resistance means 26 to the inputs c, c, and a of NAND gates 110, 111, and 112 respectively and the output h of AND gate 118 is also electrically coupled through resistance means 27 to the inputs c, c, and a of NAND gates 107, 108, and 109 respectively.

As shown in FIG. 3 first gate circuit means 20 may be divided into at least two clusters 20a and 20b of NAND and AND gates wherein each cluster of gates may accommodate as few as one or as many as six momentarily operable switching devices. It will therefore be obvious to those skilled in the art that first gate circuit means 20 may be expanded by adding one or more clusters of NAND and AND gates electrically coupled as illustrated in FIG. 3 to accommodate as many momentarily operable switching devices as desired. Accordingly, it is not intended that the present invention be limited to its ability to accommodate only twelve (12) momentarily operable switching devices as shown in FIG. 3.

Figure 4:
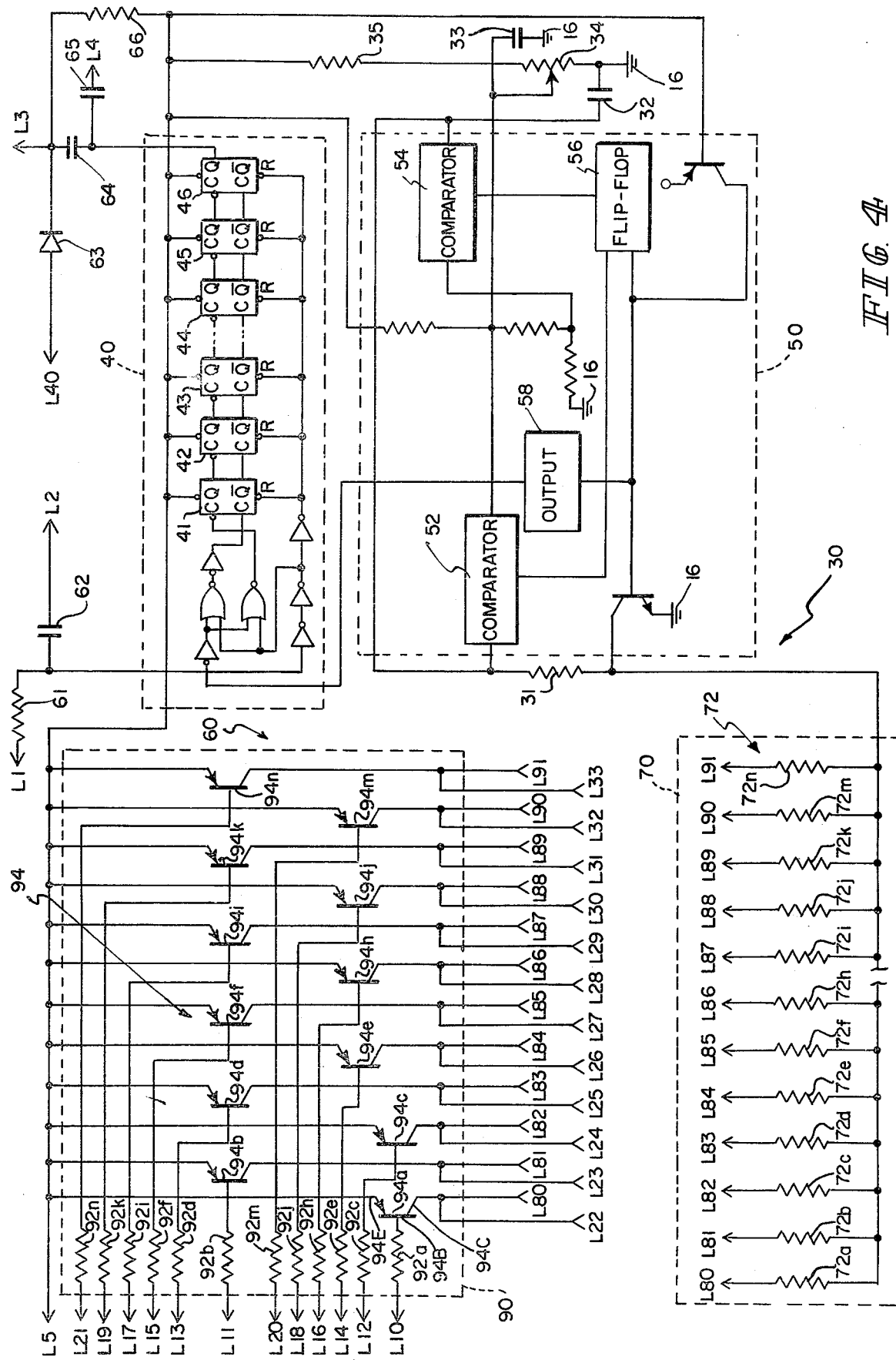
FIG. 4 is a schematic diagram of a means for timing at least one event being controlled by the control circuit of FIG. 1.

Referring now to FIG. 4 there is illustrated a preferred embodiment of timing means 30 of the control circuit 100 (FIG. 1) which may be employed in the control system 200 shown in FIG. 2. Timing means 30 includes an oscillator circuit means 60 for deriving a timing period for an event or events to be controlled by control circuit 100 and a counter 40 to determine when a timing period is complete and accordingly signal when such event or events should be terminated.

Oscillator circuit means 60 as shown in FIG. 4 includes first switching means 90, impedance means 70 and a clock 50. First switching means 90 may include any switching devices having the capability of controlling or implementing logical signals and in particular logical zero (0) signals. For example, in the embodiment of timing means 30 illustrated in FIG. 4 there are shown twelve (12) bipolar semiconductor switching devices 94a, 94b, 94c, 94d, 94e, 94f, 94h, 94i, 94j, 94k, 94m, and 94n which are preferrable PNP transistors. Each bipolar semiconductor switching device 94 has a base 94B electrically coupled through a resistance means 92a, 92b, 92c, 92d, 92e, 92f, 92h, 92i, 92j, 92k, 92m, and 92n respectively to an output d of each of the NAND gates 101 through 112 of first gate circuit means 20 (FIG. 3) respectively by means of an electrical conduit L10 through L21 respectively, an emitter 94E electrically coupled to power supply source 210 by means of an electrical conduit L5, and a collector 94C electrically coupled to indicating means 220 by means of electrical conduits L22 through L33 respectively and to impedance means 70 by means of electrical conduits L80 through L91 respectively. Again as will be apparent to those skilled in the art, it is desirable to employ as many bipolar semiconductor switching devices 94 as the number of momentarily operable switching devices SW-1 through SW-12 accommodated by control circuit 100.

Impedance means 70 includes at least as many resistance means 72 as momentarily operable switching devices SW-1 through SW-12 and therefore is not intended to be limited to any specific number of resistance means. In the embodiment illustrated in FIG. 4 there are shown twelve (12) resistance means 72a, 72b, 72c, 72d, 72e, 72f, 72h, 72i, 72j, 72k, 72m, and 72n corresponding to the number of momentarily operable switching devices SW-1 through SW-12 shown in FIG. 3 each having one of its sides electrically coupled to first switching means 90 by means of electrical conduits L80 through L91 respectively and each having the other of its sides electrically coupled to the input of clock 50. Each resistance means 72a, 72b, 72c, 72d, 72e, 72f, 72i, 72j, 72k, 72m, and 72n preferably will have a different resistance value corresponding to each momentarily operable switching device SW-1 through SW-12 such that the frequency of the electrical pulses generated by clock 50 and therefore the timing period associated with each switching device SW-1 through SW-12 will be different and selectable by the programmer. In order to increase the utility of control circuit 100, a number of resistance means 72 greater than the number of switching devices SW-1 through SW-12 may be included in impedance means 70 with each resistance means 72 having a different resistance value and electrical conduits L80 through L91 may include patch cords and male and female terminals such that resistance means 72 may be electrically coupled to first switching means 90 in a plurality of different combinations allowing for different timing intervals depending upon the use being made of control circuit 100. For purposes of this disclosure the term patch cord shall mean a cord equipped with a plug at least one end used to connect two terminals and the terms female and male shall mean designed with a hollow into which a corresponding male part fits and designed for fitting into a corresponding hollow part respectively.

Clock 50 may include any means for generating a series of electrical pulses in response to an electrical signal. An embodiment of clock 50 of control circuit 100 which may be employed in control system 200 is shown in FIG. 4 as an integrated timing circuit package of the type manufactured by Motorola Semiconductor Products, Inc. The integrated timing circuit package and therefore clock 50 includes two conventional comparators 52 and 54 and a conventional flip-flop 56 to provide the functions necessary for a complete timing circuit. Clock 50 further includes an output 58. By electrically coupling capacitance means 32 and 33 and resistance means 31 to the integrated timing circuit package as illustrated in FIG. 4, the timing circuit operates in an astable mode as an oscillator. Resistance means 35 and 34 are electrically coupled to clock 50 in order to assure that the electrical pulses generated by clock 50 have the specific frequency which should be associated with a particular resistance value of impedance means 70. As shown, the resistance value of resistance means 34 may be varied thereby allowing for the precise calibration of clock 50.

The integrated timing circuit, as an oscillator, uses as its timing elements an external resistance-capacitance network which includes capacitance means 32 and 33, resistance means 31 and 35, and variable resistance means 34. Capacitance means 32 and 33 each have one side electrically coupled to clock 50 and their other side electrically coupled to ground potential 16. Resistance means 31 has one side electrically coupled to impedance means 70 and clock 50 and the other side electrically coupled to clock 50 and capacitance means 32. Variable resistance means has one side electrically coupled to ground potential 16, a variable side electrically coupled to clock 50, and another side electrically coupled through resistance means 35 to power supply source 210 by means of an electrical conduit L5. The output 58 of clock 50 is electrically coupled to counter 40 whereby a predetermined number of the electrical pulses generated by clock 50 may be received and counted by counter 40.

An embodiment of counter 40 of control circuit 100 which may be employed in control system 200 is illustrated in FIG. 4 as a twelve (12) stage binary ripple counter. For illustration purposes, only six (6) stages, 41,42,43,44,45, and 46 of the twelve stages have been shown in FIG. 4. Each stage 41,42,43,44,45, and 46 includes a flip-flop having inputs C, outputs Q and $\bar{Q}$, and reset R. As connected in FIG. 4, counter 40 will count up to 4,096 counts or electrical pulses. The counter 40 advances the count on the negative-going edge of the clock 50 electrical pulses. The output Q of the twelfth (12th) stage 46 will remain negative during the first 2,048 counts or electrical pulses; however, when counter 40 has counted 2,048 counts, a positive-going edge appears and the output Q becomes positive for the second 2,048 counts. When counter 40 has counted up to 4,096 counts a negative-going edge appears at the output Q of the twelfth (12th) stage 46. This negative-going edge from the output Q of stage 46 is transmitted through capacitance means 65 and appears at alarm circuit means 250 as a logical zero (0). The same negative-going edge is likewise transmitted through capacitance means 64 and through diode 63 to function control means 80 by means of an electrical conduit L40 and electrically coupled to power supply source 210 through capacitance means 64 and resistance means 66 by means of an electrical conduit L5. Accordingly, a logical zero (0) is transmitted to alarm circuit means 250 and function control means 80. The counter 40 is reset by a logical one (1) signal transmitted through resistance means 61 from function control means 80 by means of an electrical conduit L1 at the conclusion of a timing period; however, counter 40 may count only upon receipt of a logical zero (0) signal from function control means 80. Coupling counter 40 to ground potential through capacitance means 62 by means of an electrical conduit L2 substantially eliminates transient signals when counter 40 is counting. As described hereinabove, various timing periods of a machine event 13 corresponding to particular cycles of the machine will be determined by the selectable frequencies of the electrical pulses generated by clock 50 and not by various numbers of electrical pulses counted by counter 40.

Figure 5:
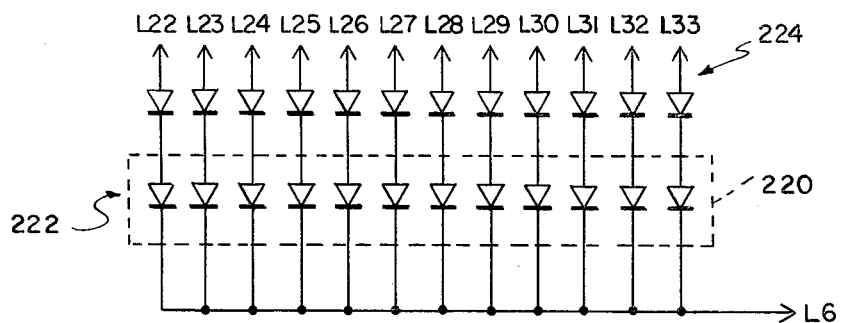
FIG. 5 is a schematic diagram of a means for indicating a plurality of cycles which may be controlled by the control system of FIG. 2.

Illustrated in FIG. 5 is an embodiment of indicating means 220 which may be employed in the control system 200 to indicate the particular cycle of the machine selected by the programmer when momentarily closing a switching device SW-1 through SW-12. Indicating means 220 as shown in FIG. 5 includes twelve (12) light emitting diodes 222 each of which has one side electrically coupled to first switching means 90 through a diode 224 biased in the same direction as its corresponding light emitting diode 222 by means of electrical conduits L22 through L33. light emitting diode 222 has a common other side electrically coupled to transient protection means 230 and delay timing means 270 by means of an electrical conduit L6. Indicating means 220 should include at least as many light emitting diodes 222 as momentarily operable switching devices SW-1 through SW-12 and therefore is not intended to be limited to the number of light emitting diodes 222 shown in FIG. 5. Diodes 224 have been inserted between first switching means 90 and indicating means 220 to limit reverse current leakage.

Figure 6:
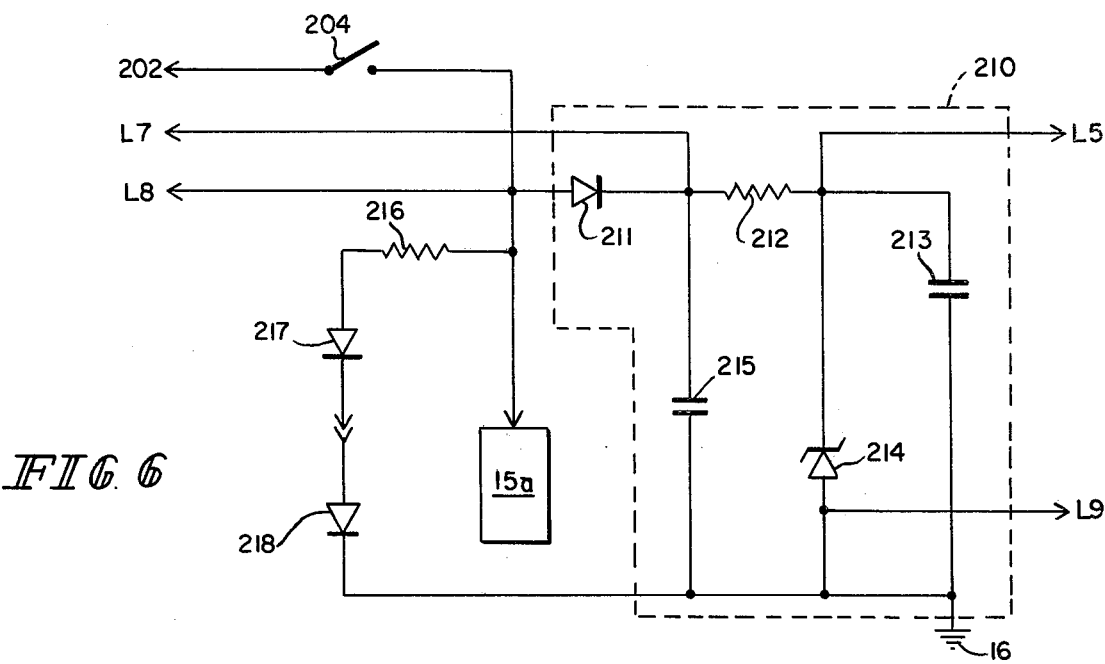
FIG. 6 is a schematic diagram of a power supply source for the control system of FIG. 2.

Referring now to FIG. 6 there is shown a typical power supply source 210 which is responsive to an external alternating reference signal 202 when a master switching device 204 is closed. When master switching device 204 is closed, the alternating reference signal 202 is applied to a machine event 15a, power supply source 210, delay timing means 270 by means of an electrical conduit L8, and through resistance means 216 and diode 217 illuminates a light emitting diode 218 thereby indicating that the machine is on and ready to be programmed. Power supply source 210, includes a diode 211, resistance means 212, capacitance means 213 and 215 and zener diode 214. As connected in FIG. 6, these electrical components rectify and filter the alternating line signal such that a substantially DC voltage of a magnitude governed by zener diode 214 is applied to second switching means 240 by means of an electrical conduit L9; alarm circuit means 250, timing means 30, first gate circuit means 20, delay timing means 270, function control means 80, and power circuit means 260 all by means of an electrical conduit L5; and machine event 15b by means of an electrical conduit L7.

Figure 7:
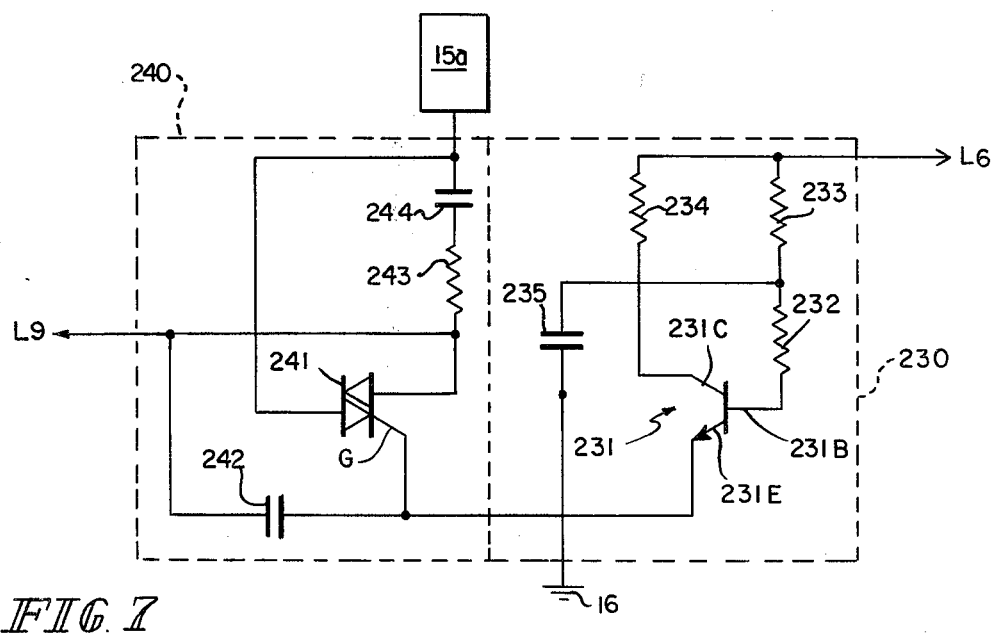
FIG. 7 is a schematic diagram of transient protection means and means for switching on and off an event being controlled by the control system of FIG. 2.

An embodiment of transient protection means 230 electrically coupled to indicating means 220 by means of an electrical conduit L6 and responsive to first switching means 90 is illustrated in FIG. 7. Also shown in FIG. 7 in conjunction with transient protection means 230 is an embodiment of second switching means 240 both of which may be employed in the control system 200 shown in FIG. 2. Transient protection means 230 includes a bipolar semiconductor switching device 231, preferably an NPN transistor, having its base 231B electrically coupled to indicating means 220 through a series of resistance means 232 and 233, its collector 231C electrically coupled to indicating means 220 through a resistance means 234, and its emitter 231E electrically coupled to second switching means 240 such that in response to activation of first switching means 90 by first gate circuit means 20 bipolar semiconductor switching device 231 is activated thereby supplying turn-on current to second switching means 240. Transient protection means 230 further includes capacitance means 235 having one of its sides electrically coupled to ground potential 16 and the other of its sides electrically coupled to one side each of resistance means 232 and 233.

Second switching means 240 includes a bidirectional semiconductor switching device 241, preferably a triac, having its gate G electrically coupled to emitter 231E of bipolar semiconductor switching device 231 of transient protection means 230. A snubber network including a serially connected capacitance means 244 and resistance means 243 is electrically coupled in parallel with bidirectional semiconductor switching device 241. Also included in second switching means 240 is a capacitance means 242 electrically coupled across the gate G and one side of bidirectional semiconductor switching device 241 serving as a secondary transient protection device. Second switching means 240 is electrically coupled to a machine event 15a whereby in response to activation of bidirectional semiconductor switching device 241 machine event 15a is activated.

Figure 8:
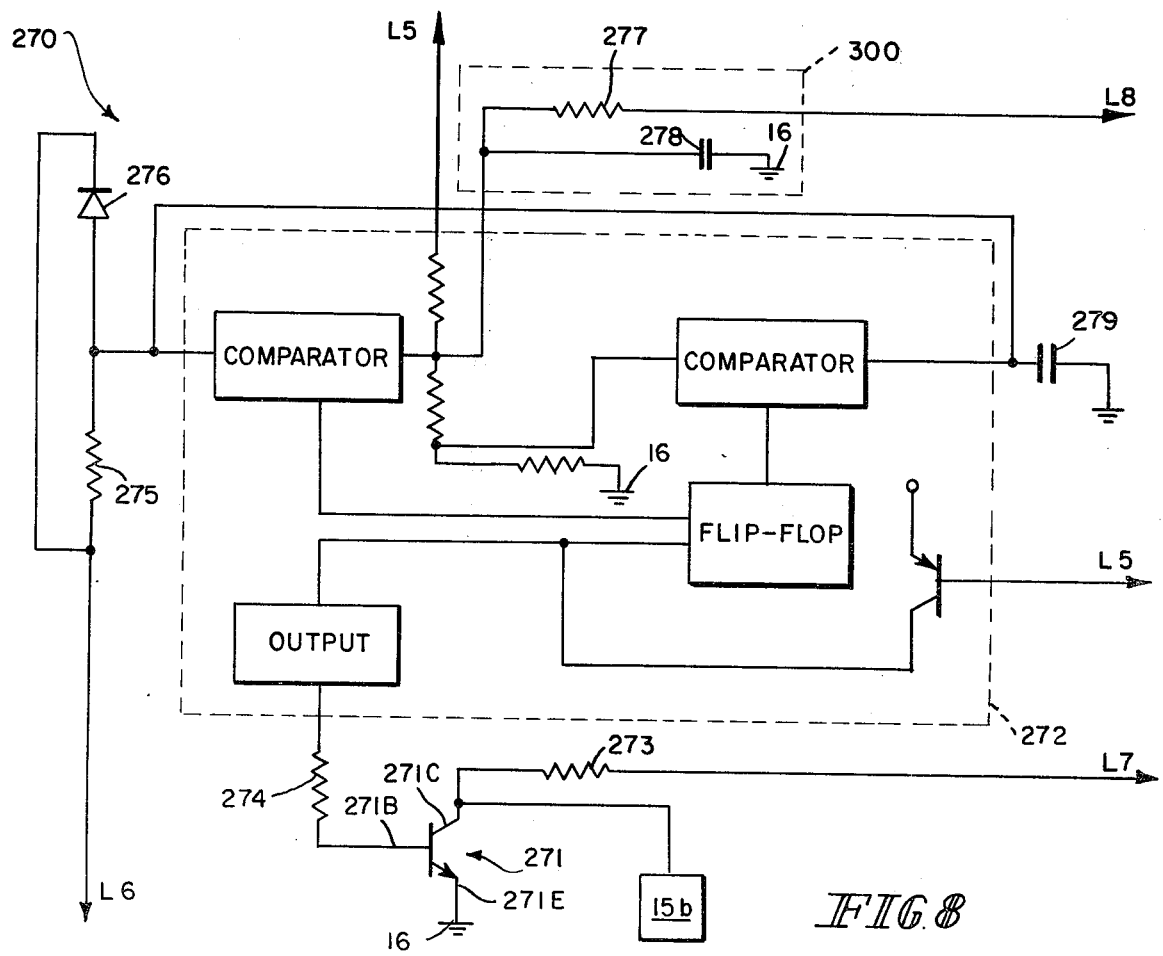
FIG. 8 is a schematic representation of a means for administering the sequential activation and deactivation of at least two subevents of an event being controlled by the control system of FIG. 2.

In the embodiment of control system 200 illustrated in FIG. 2 it is desirable that machine event 15 include at least two subevents 15a and 15b which activate and deactivate in a sequential order to activate and deactivate machine event 15. For example, machine event 15 may include a magnetron power supply for a microwave oven and subevents 15a and 15b may include a relay serially connected to a triac respectively which in turn are serially connected to the magnetron power supply such that both subevents 15a and 15b must be activated in order to activate machine event 15 and deactivated in order to deactivate machine event 15. In the present invention it is desirable that machine subevent 15a (relay) be activated before machine subevent 15b (triac) and that machine subevent 15b be deactivated before machine subevent 15a. Accordingly, a means for timing a delay 270 as shown in FIG. 8 may be employed to assure the proper sequential activation and deactivation of machine subevents 15a and 15b.

Delay timing means 270 is responsive to first switching means 90 and electrically coupled to indicating means 220 through resistance means 275 by means of an electrical conduit L6. Delay timing means 270 includes an integrated timing circuit package 272 of the type previously described as manufactured by Motorola Semiconductor Products, Inc. The integrated timing circuit 272 uses as its timing elements an external resistance-capacitance network which includes capacitance means 279 and resistance means 275.

A crest firing control means 300 include within delay timing means 270 includes capacitance means 278 and resistance means 277 each electrically coupled to integrated timing circuit 272 such that power may be applied to a high current load such as machine event 15 at line current zero. When master switching device 204 (FIG. 6) is closed, alternating reference signal 202 is aplied by means of an electrical conduit L8 through resistance means 277 to timing circuit 272.

When an electrical signal is applied to electrical conduit L6 and therefore to delay timing means 270, capacitance 279 is charged thereby delaying the activation of machine subevent 15b for at least as long as it takes capacitance means 279 to charge substantially to its peak capacity. As soon as capacitance means 279 has been substantially charged, timing circuit 272 is activated and provides a properly phased signal at its output.

The output of timing circuit 272 is electrically coupled through a resistance means 274 to a bipolar semiconductor switching device 271, preferably an NPN transistor, at its base 271B and accordingly, bipolar semiconductor switching device 271 is activated in response to timing circuit 272. The emitter 271E of bipolar semiconductor switching device 271 is electrically coupled to ground potential 16 and the collector 271C is electrically coupled to power suply source 210 through resistance means 273 by means of an electrical conduit L7 and to machine subevent 15b such that when bipolar semiconductor switching device 271 is deactivated, machine subevent 15b is thereby activated.

In order to assure that machine subevent 15b is deactivated before machine subevent 15a, delay timing means 270 further includes a diode 276 electrically coupled in parallel with resistance means 275 and in series with capacitance means 279 which forms a low impedance return path along electrical conduit L6 such that when a timing period is completed, capacitance means 279 discharges through diode 276 and a voltage is thereby applied by means of electrical conduit L6 to machine subevent 15a through transient protection means 230 and second switching means 240 to maintain machine subevent 15a in an operable state until capacitance means 279 has substantially discharged thereby activating semiconductor switching device 271.

Figure 9:
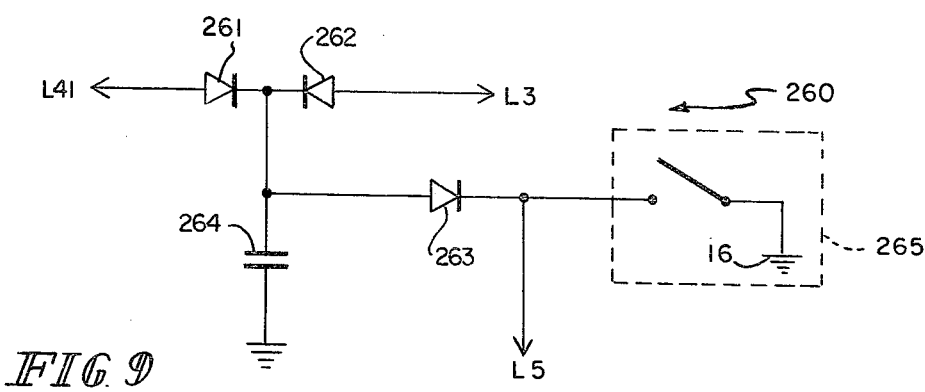
FIG. 9 is a schematic diagram of a power circuit means shown in FIG. 2.

There is provided in control system 200 a power circuit means 260, an embodiment of which is illustrated in FIG. 9. Power circuit means 260 includes a switching means 265 having one of its sides electrically coupled to ground potential 16 and the other of its sides electrically coupled to power supply source 210 by means of electrical conduit L5 and to the cathode of a diode 263. The anode of diode 263 is electrically coupled to one side of capacitance means 264 and to the cathodes of two other diodes 261 and 262. The other side of capacitance means 264 is electrically coupled to ground potential. The anode of diode 261 is electrically coupled to alarm circuit means 250 by means of an electrical conduit L41 and the anode of diode 262 is electrically coupled to function control means 80 by means of electrical conduits L3 and L40, (See FIG. 4). Switching means 265 may for example include the door to an appliance such as a microwave oven whereby when the door is closed switching means 265 is open and vice versa. During normal operation of the machine, switching means 265 would be open and capacitance means 264 would be charged through diode 263; however, when switching means 265 is closed capacitance means 264 is discharged through diode 263 and a logical zero (0) is thereby applied to electrical conduits L41 and L3 through diodes 261 and 262 respectively.

Figure 10:
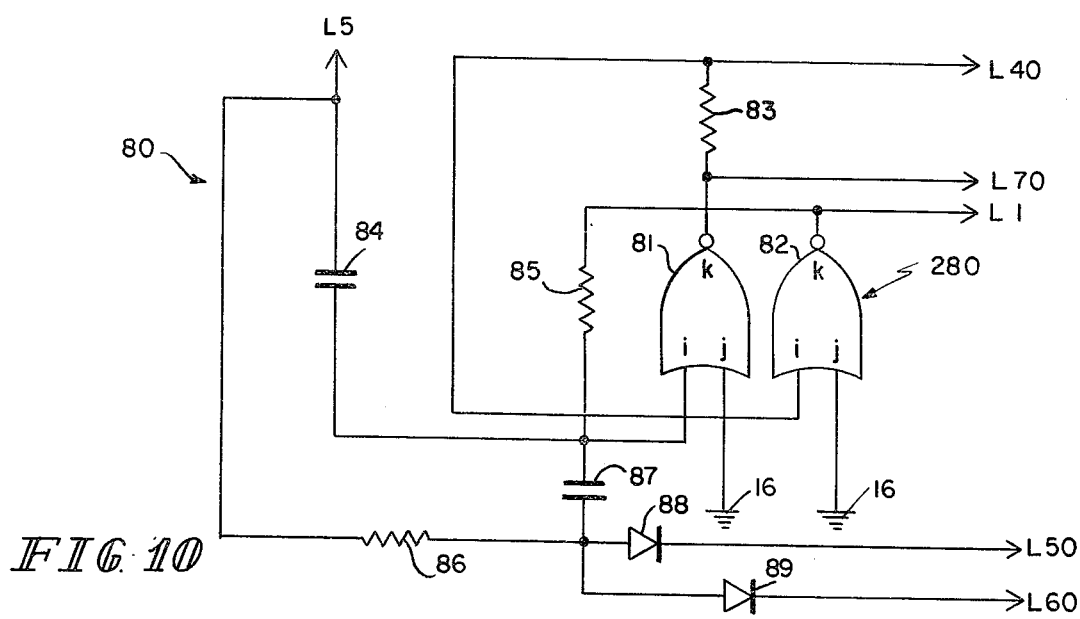
FIG. 10 is a schematic logic diagram of a means for latching a control circuit in at least one mode of operation which may be employed in the control circuit of FIG. 1.

Illustrated in FIG. 10 is an embodiment of function control means 80 of control circuit 100 (FIG. 1) which may be employed in control system 200 (FIG. 2). Function control means 80 includes a second gate circuit means 280 which further includes two (2) NOR gates 81 and 82 each having inputs i and j and an output k. The j inputs of gates 81 and 82 are each electrically coupled to ground potential 16 such that a logical zero (0) is always being applied to them. Input i or NOR gate 81 is electrically coupled to first gate circuit means 20 through capacitance means 87 and diodes 88 and 89 by means of electrical conduits L50 and L60, to output k of NOR gate 82 through resistance means 85, and to power supply source 210 through capacitance means 84 by means of an electrical conduit L5. Input i or NOR gate 82 is electically coupled to the output k of NOR gate 81 through resistance means 83 and to counter 40 of timing means 30 by means of an electrical conduit L40. Output k of NOR gate 81 is also electrically coupled to first gate circuit means 20 by means of an electrical conduit L70 and the output k of NOR gate 82 is also electrically coupled to counter 40 of timing means 30 by means of an electrical conduit L1. In general, when the output k of NOR gate 81 is a logical one (1) and the output k of NOR gate 82 is a logical zero (0), control circuit 100 (FIG. 1) will be timing a machine event 13 and when the output k of NOR gate 81 is a logical zero (0) and the output k of NOR gate 82 is a logical one (1), the machine event 13 will be off.

Figure 11:
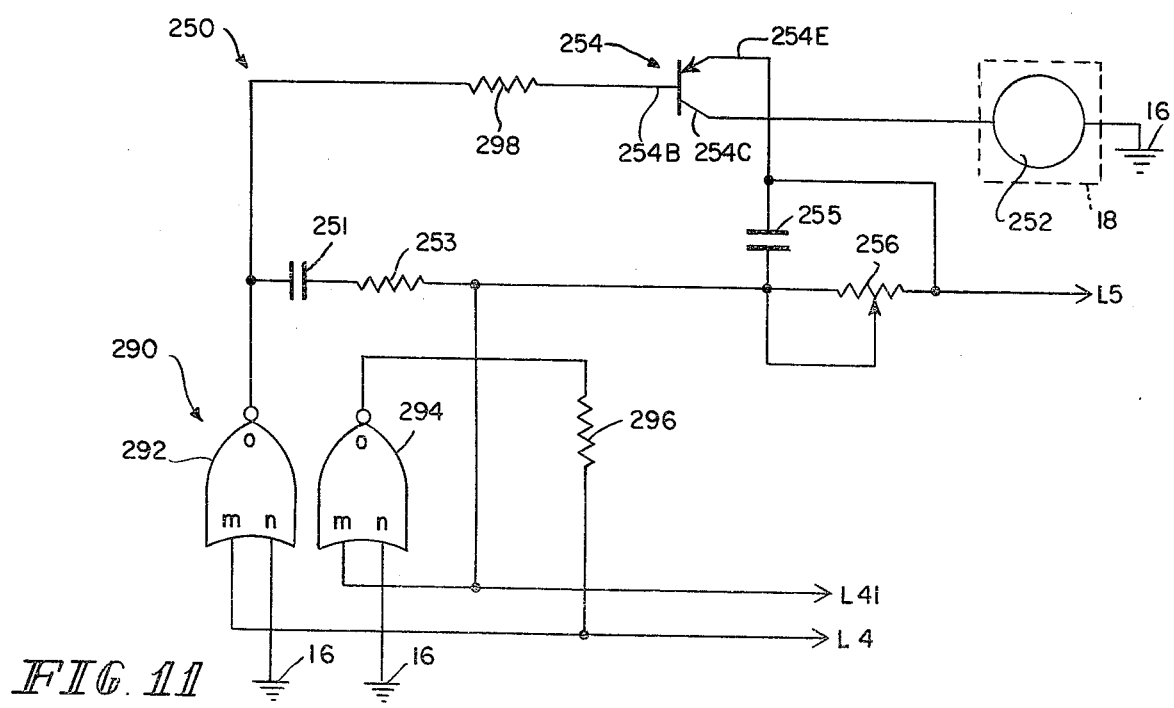
FIG. 11 is a logic representation of a means for regulating the activation and deactivation of at least one event being controlled by the control system of FIG. 2.

An alarm circuit means 250 as shown in FIG. 11 is responsive to power circuit meas 260 (FIG. 9) and counter 40 of timing means 30 (FIG. 4) and is electrically coupled to each by means of electrical conduits L41 and L4 respectively. Alarm circuit means 250 is furthermore electrically coupled to a machine event 18 and includes a third gate circuit means 290 which further includes two (2) NOR gates 292 and 294 each having inputs m and n and an output o. Machine event 18 includes an audible alarm means 252 which as illustrated is a sonalert device; however, any audible alarm device capable of responding to a DC voltage could be utilized. The n inputs of gates 292 and 294 are each electrically coupled to ground potential 16 such that a logical zero (0) is always being applied to them. Alarm circuit means 250 further includes a bipolar semiconductor switching device 254, preferable a PNP transistor, for activating machine event 18. Input m NOR gate 294 is electrically coupled to output o of NOR gate 292 through capacitance means 251 and resistance means 253, to counter 40 by means of an electrical conduit L4, and to power supply source 210 thrugh variable resistance means 256. In combination, capacitance means 251, resistance means 253, and variable resistance means 256 delay a logical transition at the output o of NOR gate 294 when a logical signal is received from NOR gate 292 at the input m of NOR gate 294. Input m of NOR gate 292 is electrically coupled to power circuit means 260 by means of an electrical conduit L41 and through resistance means 296 to the output o of NOR gate 294. Output o of NOR gate 292 is also electrically coupled to the base 254B of bipolar semiconductor switching device 254 such that in response to a logical one (1) state of NOR gate 292 switching device 254 is off and in response to a logical zero (0) state of NOR gate 292 switching device 254 is turned on. The emitter 254E of bipolar semiconductor switching device 254 is electrically coupled to power supply source 210 and its collector 254C is electrically coupled to machine event 18. In general, when the output o of NOR gate 292 is a logical one (1) and the output o of NOR gate 294 is a logical zero (0) machine event 18 will be off and when the output o of NOR gate 292 is a logical zero (o) and the output o of NOR gate 294 is a logical one (1) machine event 18 will be turned on. Capacitance means 255 serves as a low impedance transient path across resistance means 256.

Referring now to FIGS. 1–11 the operation of control system 200 in accordance with the present invention can best be described by describing the operation of one cycle of the system 200 represented by the momentary closing of one switching device SW-1 of programming means 14.

Before momentarily operable switching device SW-1 is closed by a programmer, a master switching device 204, (FIG. 6) will have been closed thereby applying power to control circuit 100 such that it is latched in a ready mode of operation. Immediately after master switching device 204 is closed the inputs i and j of NOR gate 82 of second gate circuit means 280 (FIG. 10) will each be logical zero (0). Accordingly, the output k of NOR gate 82 is logical one (1) thereby causing the inputs i and j of NOR gate 81 of second gate circuit means 280 to be logical one (1) and logical zero (0) respectively and its output k to be a logical zero (0). Since output k of NOR gate 81 is electrically coupled to first gate circuit means 20, the logical zero (0) output of NOR gate 81 is aplied through diodes 23 and 24 (FIG. 3) to an input a or c of each of the NAND gates 101 through 112 of first gate circuit means 20 such that each of the NAND gates 101,102,104,105,107,108,110, and 111 have a logical one (1), logical one (1), and logical zero (0) applied to their inputs a,b, and c respectively and each of the NAND gates 103,106,109, and 112 have a logical zero (0), logical one (1), and logical one (1) applied to their inputs a,b, and c respectively thereby causing each NAND gate 101 through 112 to have a logical one (1) output d. In response to the logical one (1) outputs d of NAND gates 101 through 112 each AND gate 113 through 118 will likewise have a logical one (1) output h. As previously described, the outputs h of AND gates 114 and 117 are electrically coupled to the input i of NOR gate 81; therefore, the logical one (1) output h of AND gates 114 and 117 are applied to input i of NOR gate 81 which also has a logical one (1) being applied to its input i from output k of NOR gate 82 thereby latching control circuit 100 (FIG. 1) in a ready mode of operation.

The initial logical zero (0) applied to input i of NOR gate 82 when master switching device 204 is closed is created by capacitance means 264 (FIG. 9) which in charging appears as a logical zero (0). This logical zero (0) is transmitted through diodes 262 and 63 (FIG. 4) and applied to the input i of NOR gate 82.

When a momentarily operable switching device SW-1 is closed by a programmer, a ground or zero potential 16 representing a logical zero (0), is applied at junction J1 of first gate circuit means 20 (FIG. 3). Immediately thereafter, this logical zero (0) is applied to inputs b of NAND gates 102 and 103 and to input e of AND gate 113. Accordingly, NAND gate 102 has inputs a,b, and c which are logical one (1), logical zero (0) and logical zero (0) respectively, NAND gate 103 has inputs a,b, and c which are logical zero (0), logical zero (0), and logical one (1) respectively, and AND gate 113 has inputs e,f, and g which are logical zero (0), logical one (1), and logical one (1) respectively. The changes in the inputs e,f, and g of AND gate 113 cause its output h to make a logical one (1) to logical zero (0) transition correspondingly causing a logical zero (0) to be applied to the input e of AND gate 114. The output h of AND gate 114 is thereby caused to make a logical one (1) to logical zero (0) transition. All other NAND gates 101 and 104 through 112 maintain the logical states both at their inputs a,b, and c and outputs d which existed during the ready mode of operation. Also all other AND gates 115 through 118 maintain the logical states both at their inputs e,f, and g and outputs h which existed during the ready mode of operation.

The logical zero (0) appearing at the output h or AND gate 114 is applied to input i of NOR gate 81 of second gate circuit means 280 (FIG. 10) thereby causing its output k to make a logical zero (0) to logical one (1) transition. The logical one (1) output k of NOR gate 81 is then applied to the cathodes of diodes 23 and 24 of first gate circuit means 20 thereby reverse biasing diodes 23 and 24 and to the input i of NOR gate 82 thereby causing the output k of NOR gate 82 to make a logical one (1) to logical zero (0) transition. The logical zero (0) output k of NOR gate 82 is applied to the input i of NOR gate 81 which in conjunction with the logical zero (0) being applied at input i from AND gate 114 latches control circuit 100 in a functional mode of operation.

The logical one (1) from output k of NOR gate 81 which is applied to diodes 23 and 24 of first gate circuit means 20 allows a logical one (1) from the output h of AND gate 115 to be applied to the c input of NAND gate 101, the c input of NAND gate 102, and the a input of NAND gate 103. NAND gate 101 now has three logical one (1) inputs a,b, and c which cause its output d to make a logical one (1) to logical zero (0) transition. All other NAND gates 102 through 112 maintain logical one (1) outputs d.

While the process described above for latching control circuit 100 in a functional mode of operation requires a plurality of logical transitions by the digital circuitry of first gate circuit means 20 and function control means 80 it will be recognized by those skilled in the art that the momentary closing of switching device SW-1 and the latching of control circuit 100 in a functional mode of operation occur substantially instantaneously.

Referring now to FIGS. 4,5,7, and 8, the logical zero (0) output of NAND gate 101 is applied to the base 94B of bipolar semiconductor switching device 94a which is thereby turned on activating oscillator circuit means 60 and therefore timing means 30 of control circuit 100. When bipolar semiconductor switching device 94a is turned on, an electrical signal is simultaneously transmitted to impedance means 70 to derive a timing period for a first machine event 15 and through indicating means 220 to activate first machine event 15 by sequentially activating two machine subevents 15a and 15b.

The electrical signal from first switching means 90 activates one of the light emitting diodes 222 of indicating means 220 to indicate the operation of the machine cycle corresponding to switch SW-1. Thereafter the electrical signal is applied simultaneously to second switching means 240 through transient protection means 230 thereby activating a machine subevent 15a and to delay timing means 270 where the signal is delayed for a timing period determined by the time required to substantially charge capacitance means 279 before activating a machine subevent 15b. As previously indicated it is desirable in control system 200 that machine subevent 15b be activated after machine subevent 15a; however, as will be apparent to those skilled in the art the signal emitted by first switching means 90 of control circuit 100 could without additional circuitry be utilized to simultaneously activate a plurality of events or subevents which may be timed for a timing period derived from impedance means 70.

The signal derived after passing through impedance means 70 activates clock 50 which as an oscillator generates a series of electrical pulses having a frequency determined by the value of the particular resistance means 72 of impedance means 70 electrically coupled to bipolar semiconductor switching device 94a. The electrical pulses generated by clock 50 are counted by counter 40. Counter 40 as illustrated in FIG. 4 has the capacity to count up to 4,096 counts or electrical pulses. While counter 40 is counting the first 2,048 electrical pulses the output Q of stage 46 and therefore the output of counter 40 is a negative signal. During the counting of the second 2,048 electrical pulses the output of counter 40 is a positive signal. Therefore while counter 40 is counting the second 2,048 electrical pulses, a positive signal is applied to capacitance means 64 and 65 causing each of them to charge to substantially their capacity. When 4,096 electrical pulses have been counted the positive pulse is removed from capacitance means 64 and 65 and the capacitance means then begin to discharge. As capacitance means 64 and 65 discharge, a negative-going pulse representing a logical zero (0) is applied to the input i of NOR gate 82 of second gate circuit means 280 (FIG. 10) and the input m of NOR gate 294 of third gate circuit means 290 (FIG. 11) respectively. This negative-going pulse provides the necessary signal to indicate the completion of the timing period and thereby deactivate machine event 15. Accordingly, as is apparent from the above description, the timing period of machine event 15 being controlled by control circuit 100 is derived not from the number of pulses counted, where the event 15 would have a different timing period for each cycle determined by counter 40 counting various numbers of electrical pulses, but rather by the frequency of a predetermined number of pulses (4,096) counted by counter 40. The period of time required for counter 40 to count 4,096 pulses will depend upon the frequency of such pulses.

Turning now to FIG. 10, the logical zero (0) applied to input i of NOR gate 82 upon completion of a timing period causes the output k of NOR gate 82 to make a logical zero (0) to logical one (1) transition. This logical one (1) output k of NOR gate 82 is applied to the input i of NOR gate 81 thereby causing the output k of NOR gate 81 to make a logical one (1) to logical zero (0) transition. The logical zero (0) output k of NOR gate 81 is applied to first gate circuit means 20 (FIG. 3) through diodes 23 and 24 thereby returning all inputs a,b, and c of NAND gates 101 through 112 and inputs e,f, and g of AND gates 113 through 118 to the logical states which existed during the preexisting ready mode of operation. Accordingly, a logical one (1) from the outputs h of AND gates 114 and 117 is applied to input i of NOR gate 81 which in combination with the logical one (1)

being applied to the same input from the output k of NOR gate 82 causes control circuit 100 to latch in a ready mode of operation and deactivate machine event 15.

Just as the activation of machine event 15 occurred by means of the sequential activation of machine subevents 15a and 15b so does the deactivation of machine event 15 occur by means of the sequential deactivation of machine subevents 15a and 15b. For example in the embodiment of control system 200 illustrated in FIG. 2 it is desirable that machine subevent 15b be deactivated before machine subevent 15a, thereby deactivating machine event 15. Accordingly, when control circuit 100 is latched in a ready mode of operation after the completion of a timing period for machine event 15 capacitance means 279 (FIG. 8) is discharged through a low impedance path which includes diode 276 to machine subevent 15a such that when control circuit 100 is latched in a ready mode of operation machine subevent 15b is deactivated immediately and machine subevent 15a is deactivated after a timing period determined by the time required for capacitance means 279 to substantially discharge.

Having latched control circuit 100 in a ready mode of operation and deactivated machine event 15 a second machine event 18 is activated and deactivated by alarm circuit means 250 of control system 200. As previously described, with the discharge of capacitance means 65 a logical zero (0) is applied to the input m of NOR gate 294 of third gate circuit means 290 (FIG. 11) at the completion of the timing period for machine event 15. Prior to this time, a logical one (1) had been applied to input m of NOR gate 294 by power supply source 210 thereby placing a logical zero (0) at the output 0 of NOR gate 294 and correspondingly a logical zero (0) at the input m of NOR gate 292. Accordingly, the output 0 of NOR gate 292 was logical one (1). However, when the logical zero (0) is applied to input m of NOR gate 294 its output 0 is caused to make a logical zero (0) to logical one (1) transition thereby applying a logical one (1) to input m of NOR gate 292 and causing its output 0 to make a logical one (1) to logical zero (0) transition. The logical zero (0) output 0 of NOR gate 292 is applied to bipolar semiconductor switching device 254 which activates machine event 18. Simultaneously the logical zero (0) output 0 of NOR gate 292 is applied to the m input of NOR gate 294 through a resistance capacitance timing network which includes capacitance means 251, resistance means 253, and variable resistance means 256. Capacitance means 251 is charged to substantially one-third the voltage of power supply source 210 and consequentally a logical one (1), in fact is applied to input m of NOR gate 294. The logical one (1) applied at the input m of NOR gate 294 will cause a logical one (1) to logical zero (0) transition at its output; however, this logical transition will have been delayed for a timing period determined by the time required to charge capacitance means 251 to substantially one-third the power supply source 210 voltage. The logical zero (0) output 0 of NOR gate 294 is again applied to the input m of NOR gate 292 causing the output 0 of NOR gate 292 to make a logical to logical one (1) transition thereby deactivating machine event 18.

As described hereinabove, when master switching device 204 is initially closed capacitance means 264 of power circuit means 260 (FIG. 9) is charged to substantially its capacity, but only if switching device 265 is open. During a machine cycle or a functional mode of operation of control circuit 100, switching device 265 would normally be open; however, if during a cycle, switching device 265 is closed i.e. a door on the machine is opened, capacitance means 264 will discharge through diode 263 thereby applying a logical zero (0) through diodes 262 and 63 (FIG. 4) to the input i of NOR gate 82 of second gate circuit means 280 causing its output k to make a logical zero (0) to logical one (1) transition. As previously described this logical one (1) output k of NOR gate 82 results in a logical zero (0) output k of NOR gate 81 which is applied to first gate circuit means 20 thereby latching control circuit 100 in a ready mode of operation and deactivating machine event 15 which would normally result in the activation of machine event 18 by alarm circuit means 250.

In order to assure that machine event 18 is not activated when switching device 265 is closed, i.e. when capacitance means 264 is discharged, a logical zero (0) is simultaneously applied through diode 261 to the input m of NOR gate 292 to assure that the ouput of NOR gate 292 will be logical one (1). If counter 40 (FIG. 4) has counted 2,048 electrical pulses or less when switching device 265 is closed a logical zero (0) would already exist at the input m of NOR gate 292; however, if counter 40 has counted more than 2,048 electrical pulses when switching device 265 is closed a logical zero would be applied to input m of NOR gate 294 which would result in a logical one (1) at the input m of NOR gate 292 thereby activating machine event 18. A logical one (1) is precluded from being applied to the m input of NOR gate 292 by the logical zero (0) from capacitance means 264 which is applied to the m input of NOR gate 292 through diode 261 thereby maintaining the logical one (1) output 0 of NOR gate 292.

It will be further apparent to those skilled in the art that various changes in the specific embodiments illustrated and described herein and apparently modified embodiments of the present invention may be made without departing from its scope. Accordingly, it is intended that all material contained in the preceding description or shown on the accompanying drawings be interpreted as illustrative only and not in a limiting sense.

What we claim is:

1. A control circuit for a machine and the like having at least one cycle made up of at least one event comprising: at least six momentarily operable programming means each of which provides a substantially logical zero signal when momentarily closed for actuating said cycle and for selectively programming at least six time periods of said event, first gate circuit means for implementing said logical zero signal provided by said programming means, said first gate circuit means including at least six NAND gates having inputs electrically coupled to said programming means and at least three AND gates at least two of which have inputs electrically coupled to outputs of said NAND gates and at least one of which is responsive to logical states of outputs of said two AND gates, timing means responsive to logical states of said outputs of said NAND gates for timing said event in accordance with selectively programmed time periods, and function control means responsive to logical states of the output of said one AND gate of said first gate circuit means for latching said control circuit in at least one mode of operation.

2. The control circuit as recited in claim 1 wherein said first gate circuit means is responsive to the latching of said function control means.

3. The control circuit as recited in claim 2 wherein said function control means includes second gate circuit means having at least two NOR gates.

4. The control circuit as recited in claim 3 wherein one at least of said NAND gates of said first gate circuit means is latched in at least one logical state in response to said function control means.

5. The control circuit as recited in claim 4 wherein said event of said machine is activated when said NAND gate is latched in a first logical state and deactivated when said NAND gate is latched in a second logical state.

6. The control circuit as recited in claim 5 wherein some at least of said NAND gates and one at least of said AND gates of said first gate circuit means are electrically coupled to said programming means such that two at least of said AND gates are caused to make logical transitions in response to said programming means.

7. The control circuit as recited in claim 6 wherein one at least of said AND gates is caused to make a logical zero transition.

8. The control circuit as recited in claim 6 wherein said second gate circuit means of said function control means is responsive to a logical transition of one at least of said AND gates of said first gate circuit means.

9. The control circuit as recited in claim 8 wherein one at least of said NOR gates of said second gate circuit means latches in a logical state in response to said logical transition of said AND gate of said first gate circuit means whereby said control circuit is latched in said mode of operation.

10. The control circuit as recited in claim 9 wherein said NOR gate of said second gate circuit means latches in a logical one state.

11. The control circuit as recited in claim 9 wherein said NAND gate of said first gate circuit means is latched in a logical zero state in response to the latching of said NOR gate of said second gate circuit means in said logical state thereby activating said event.

12. The control circuit as recited in claim 5 wherein said function control means latches said control circuit in at least another mode of operation upon conclusion of a programmed time period.

13. The control circuit as recited in claim 12 wherein said timing means includes oscillator circuit means for generating a series of electrical pulses having a frequency variable in accordance with said selectively programmed time periods and a counter for counting a fixed number of said electrical pulses generated by said oscillator circuit means.

14. The control circuit as recited in claim 13 wherein said oscillator circuit means is activated when said NAND gate of said first gate circuit means is latched in said first logical state whereby a timing period for said event is derived.

15. The control circuit as recited in claim 14 wherein said second gate circuit means of said function control means latches in a logical state when said counter of said timing means has counted said fixed number of said electrical pulses whereby said control circuit is latched in said other mode of operation.

16. The control circuit as recited in claim 15 wherein one at least of said NOR gates of said second gate circuit means latches in a logical zero state.

17. The control circuit as recited in claim 15 wherein said NAND gate of said first gate circuit means is latched in a logical one state in response to said latching of said second gate circuit means when said counter has counted said fixed number of said electrical pulses thereby deactivating said event.

18. The control circuit as recited in claim 15 wherein said timing means is reset in response to said latching of said second gate circuit means of said function control means when said counter has counted said fixed number of said electrical pulses.

19. In a control circuit for controlling a machine and the like having at least one cycle made up of at least one event, a timing means for timing said event comprising: oscillator circuit means for deriving at least two timing periods for said event; said oscillator circuit means including at least one bipolar semiconductor switching device responsive to at least one electrical signal, a clock responsive to activation of said switching device for generating a series of electrical pulses, and impedance means for defining at least two selectable frequencies of said electrical pulses, said impedance means including at least two resistors and at least one patch cord whereby at least one frequency is defined by selectively electrically coupling said switching device to one of said resistors; and a counter for counting a fixed number of said electrical pulses generated by said oscillator circuit means; said timing periods substantially equivalent to various times required for said counter to count said fixed number of said electrical pulses.

20. The timing means as recited in claim 19 wherein said bipolar semiconductor switching device is a transistor having its base electrically coupled to said electrical signal and its collector electrically coupled to said impedance means.

21. The timing means as recited in claim 20 wherein a timing period for said event is determined by a selected frequency of said electrical pulses generated by said clock and said counter signals completion of said timing period after counting said fixed number of said pulses.

22. A control system for controlling a machine and the like having at least one cycle made up of at least two events comprising in combination: a power supply source responsive to an alternating reference signal; a control circuit of which only portions are responsive to an electrical signal provided by said power supply source including a plurality of momentarily operable programming means each of which is electrically coupled to ground potential whereby a substantially logical zero signal is provided for actuating said cycle when a programming means is momentarily actuated, gate circuit means for latching said control circuit in at least one mode of operation wherein a first event is activated, and timing means responsive to said latching of said gate circuit means for timing said first event of said machine in accordance with a selectively programmed time period and for signalling completion of said time period, said gate circuit means latching said control circuit in at least another mode of operation wherein said first event is deactivated; and alarm circuit means for regulating a second event.

23. The control system as recited in claim 22 wherein said timing means include oscillator circuit means for generating a series of electrical pulses and a counter for counting a fixed number of said electrical pulses generated by said oscillator circuit means.

24. The control system as recited in claim 23 wherein said gate circuit means includes first gate circuit means for implementing said programming means and second gate circuit means responsive to implementation of said programming means by said first gate circuit means for latching said control circuit in a first mode of operation.

25. The control system as recited in claim 24 wherein said first gate circuit means is responsive to said latching of said second gate circuit means.

26. The control system as recited in claim 25 wherein said second gate circuit means is further responsive to signalling of completion of said time period by said timing means whereby said control circuit is latched in a second mode of operation.

27. The control system as recited in claim 26 wherein said first gate circuit means includes a plurality of NAND gates and a plurality of AND gates some at least of which are electrically coupled to some at least of said NAND gates.

28. The control system as recited in claim 27 wherein said second gate circuit means includes at least two NOR gates one at least of which is electrically coupled to said first gate circuit means and one at least of which is electrically coupled to said timing means.

29. The control system as recited in claim 28 wherein one at least of said NAND gates of said first gate circuit means is latched in at least one logical state in response said latching of to said second gate circuit means.

30. The control system as recited in claim 29 wherein one at least of said events is activated when said NAND gate of said first gate circuit means is latched in a first logical state and deactivated when said NAND gate is latched in a second logical state.

31. The control system as recited in claim 23 wherein said alarm circuit means is actuated in response to a signal provided by said timing means indicating completion of said time period of said first event.

32. The control system as recited in claim 31 wherein said alarm circuit means includes at least two NOR gates one at least of which is electrically coupled to said timing means.

33. The control system as recited in claim 32 wherein one at least of said NOR gates of said alarm circuit means is caused to make a logical transition when said counter of said timing means has counted said fixed number of said electrical pulses thereby activating said second event of said machine.

34. The control system as recited in claim 33 wherein said logical transition of said NOR gate causes another one of said NOR gates to make a logical transition thereby deactivating said second event of said machine.

35. The control system as recited in claim 34 wherein said logical transition of said other NOR gate is delayed such that a timing period for said second event is thereby derived.

36. The control system as recited in claim 35 further including power circuit means responsive to a machine condition for establishing at least one mode of operation of said control circuit whereby said cycle of said control system is truncated.

37. The control system as recited in claim 36 further including indicating means responsive to actuation of said timing means for indicating execution of said cycle.

38. A control system for controlling a machine and the like having at least one cycle made up of at least one event which includes at least two subevents comprising in combination: a power supply source responsive to an alternating reference signal; a control circuit of which only portions are responsive to an electrical signal provided by said power supply source including a plurality of momentarily operable programming means each of which is electrically coupled to ground potential whereby a substantially logical zero signal is provided for actuating said cycle when a programming means is momentarily actuated, gate circuit means for latching said control circuit in at least one mode of operation wherein said event is activated, and timing means responsive to said latching of said gate circuit means for timing said event of said machine in accordance with a selectively programmed time period and for signalling completion of said time period, said gate circuit means latching said control circuit in at least another mode of operation wherein said event is deactivated; and delay timing means electrically coupled to said timing means for administering a sequential activation and deactivation of said two subevents in response to initiation and completion of said time period.

39. The control system as recited in claim 38 wherein said timing means includes oscillator circuit means for generating a series of electrical pulses and a counter for counting a fixed number of said electrical pulses generated by said oscillator circuit means.

40. The control system as recited in claim 39 further including switching means responsive to initiation and completion of said time period for activating and deactivating a first subevent of said event.

41. The control system as recited in claim 40 wherein said delay timing means in response to initiation of said time period delays activation of a second subevent of said event for a predetermined time period after activation of said first subevent.

42. The control system as recited in claim 41 wherein said oscillator circuit means includes a first switching means responsive to said latching of said gate circuit means and said delay timing means and a second switching means are responsive to actuation of said first switching means.

43. The control system as recited in claim 42 wherein said delay timing means includes at least one capacitance means and a timing circuit.

44. The control system as recited in claim 43 wherein said activation of said second subevent is delayed for a period determined by a time required to substantially charge said capacitance means.

45. The control system as recited in claim 44 wherein said second switching means is electrically coupled to said delay timing means whereby deactivation of said first subevent is delayed.

46. The control system as recited in claim 45 wherein deactivation of said first subevent is delayed for a period determined by a time required for said capacitance means to substantially discharge.

* * * * *